May 6, 1958  E. BRANSON  2,833,194
REVERSIBLE DISC PLOW ATTACHMENT AND COMBINATION
Filed April 15, 1955
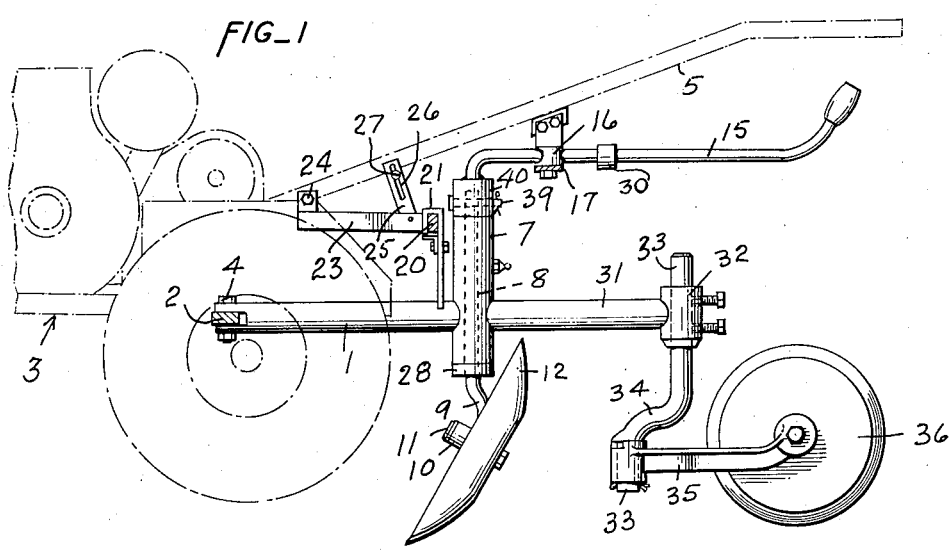
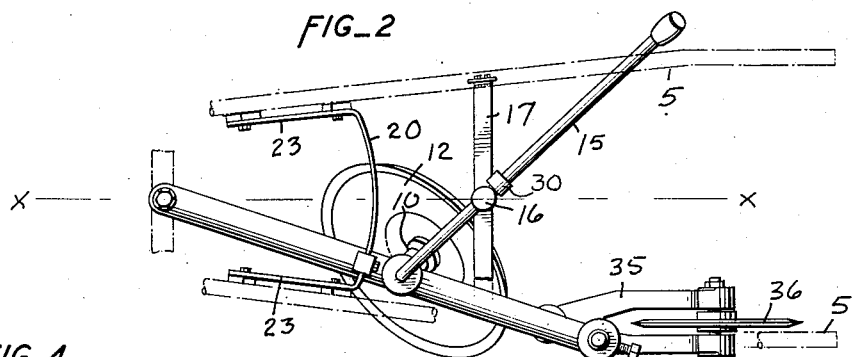
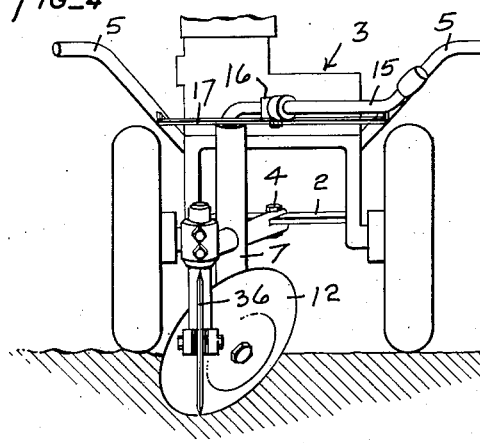
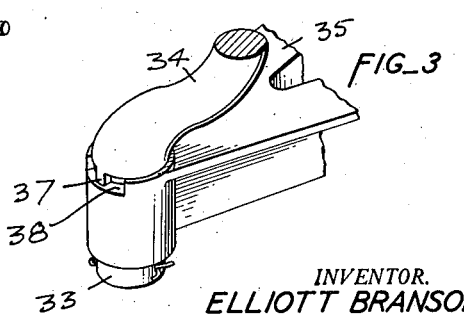
INVENTOR.
ELLIOTT BRANSON
BY
Boyken, Mohler & Wood.
ATTORNEYS Patented May 6, 1958

2,833,194

REVERSIBLE DISC PLOW ATTACHMENT AND COMBINATION

Elliott Branson, Hayward, Calif.

Application April 15, 1955, Serial No. 501,520

4 Claims. (Cl. 97—31)

This application is a continuation in part of my application, Serial No. 405,884, filed January 25, 1954, now abandoned and relates to a reversible disc plow.

One of the objects of the invention is the provision of a simple, economically made, efficient and easily operated reversible disc plow that is adapted to cut a furrow slice from the same side of the furrow upon movement of the plow in either direction longitudinally of said furrow, and to throw the furrow slice to the same side of said furrow.

To clarify the above, in the plowing of a relatively narrow strip of ground by a conventional disc plow, the earth will either be thrown outwardly away from the center of the strip, or it will be thrown inwardly toward the center, according to the direction of movement of the plow. The plow does not normally go back and forth along the same furrow, but moves in the same direction in a continuous path, either starting from the center and working outwardly, or starting from the outside and working inwardly. The result is that the operator must later fill in the center or the marginal portions according to how he plowed the strip.

Various reversible disc plows have been produced, but most of these follow a design in which complicated structure including gears or sector gears are connected through linkages with the plow supporting spindles to change the angles of the discs upon each reversal in direction. Also in these structures positive locking means is required to lock the discs at the desired angle due to the fact that the working pressure against the discs during plowing tends to swing the discs to an inoperative position.

One of the objects of this invention is the provision of extremely simple means for changing the angle of attack of the discs that omits complicated gears, linkages, etc.

Another object of this invention is the provision of structure in which the disc automatically tends to be held in operative position during movement in a cutting operation.

With the present invention, the operator may plow so as to throw all of the dirt to the left or to throw it all to the right, as desired. This may become quite important at times, such as when plowing close to a line or fence. Of course the plow can be used to operate the same as a conventional plow.

Also, with the present invention, the attachment is such that it is adapted to be readily attached to, and removed from, a power propelled walking type tractor so as not to interfere with the operator that walks behind the tractor with his hands on the usual handle bars that are used to guide the tractor and its attachments.

In this last feature, above mentioned, the attachments heretofore designed have, insofar as I am aware, been so constructed as to be incapable of use in connection with a walking type tractor and the controls on such previous devices for the plow, have been such as to be automatically operated upon turning the tractor, thus making it impossible for the operator to control the discs, or else the controls are so arranged that an operator walking behind the plow cannot possibly manipulate the controls.

With the present device the controls for the disc plow are readily accessible to the operator walking behind the plow.

Other objects and advantages will appear in the description and in the drawings.

In the drawings, Fig. 1 is a side elevational view of the plow unit in full line, one portion being shown in cross section. A conventional walking type tractor is shown in dot-dash lines.

Fig. 2 is a plan view of the plow unit of Fig. 1, the plow being shown in full line in one position for cutting a furrow slice with its right hand edge and in dot-dash line in the reversed position. Also portions of the conventional tractor of Fig. 1 are indicated in dot-dash line.

Fig. 3 is an enlarged fragmentary part sectional view of the mounting for the coulter bar.

Fig. 4 is a rear elevational view of the tractor and attachment.

In detail, the invention as illustrated comprises a horizontally extending plow hitch 1 in the form of a rigid bar. This bar is adapted to be secured at its forward or leading end to a portion of the usual frame 2 (Fig. 2) of the tractor 3 (Fig. 1). This connection between the forward end of bar 1 and frame 2 is preferably a vertical pivot 4, although this could be a ball joint, such as is used in the ordinary trailer hitch.

The point at which pivot 4 is located is preferably along the longitudinal axis of the tractor illustrated in dot-dash line X—X in Fig. 2, and which tractor is of the small, walking type having handle bars 5 that extend rearwardly for grasping by the hands of the operator.

Pivot 4 is at the forward end of the hitch. In using the words "forward," "forwardly," "rear," "rearwardly" or words of similar meaning in the description and claims, reference is made to the forward end of the tractor. Thus the pivot 4 is at the leading end of the hitch 1 relative to the normal forward movement of the tractor.

A vertically disposed tubular bearing sleeve 7 is rigid with hitch 1 at a point spaced rearwardly of pivot 4, and this sleeve carries a bearing for rotatably supporting a vertically extending spindle 8.

The lower end of spindle 8 is bent at 9 to extend slightly rearwardly and the lower end of the portion 9 carries a bearing 10 that is inclined relative to vertical and to horizontal. This bearing rotatably supports a short stub shaft 11 that, in turn, has a disc plow 12 secured thereto.

Disc plow 12 is positioned at an angle to vertical and to horizontal, as is customary for disc plows in order that they will perform their intended function. It should be noted, however, that in this instance there is a variation from the conventional structure in that bearing 10 projects from the forwardly facing concave side of the disc, and the angle of the lower end portion 9 of the spindle will effect an automatic positioning of the plow to its plowing position for throwing the dirt to one side or to the other side of the path of travel of the plow according to how the operator moves the plow.

In the conventional arrangement, the bearing that supports each disc projects from the rearwardly facing, convex side of the disc in traling relation thereto, with the result that the disc leads the bearing instead of trailing it. In such a circumstance the disc will swing around to trailing relation to the bearing with its convex side leading (which is an inoperative position) unless a locking means is provided to securely lock the disc in leading relation to the bearing that supports it.

As seen in Fig. 1, the disc plow 12 trails the bearing 11, thereby automatically remaining in an operative position, irrespective of which edge is cutting, as will appear more clearly later on.

A rearwardly extending handle 15 is rigidly, but releasably, secured to the upper end of the spindle 8, and intermediate the ends of said handle is a bearing 16 in which said handle is slidable longitudinally of the latter. The connection between handle 15 and spindle 8, as shown in Fig. 1, comprises a socket member 40 integral with handle 15 into which the upper end of the spindle 8 extends, and a pin 39 removably extends through registering openings in the sides of said socket member and said upper end of the spindle. The bearing 16 is vertically pivoted to a rigid cross frame member 17 (Figs. 2, 3) which member extends between handles 5, being secured at its ends to said handles. The pivoted bearing 16 is centrally between said handles and between the ends of the cross frame member 17, which member may be a part of the tractor or an element of the plow attachment according to whether or not the tractor is provided with said member.

Also secured to handles 5 or to any suitable portion of the tractor, is a horizontally disposed bar 20 (Fig. 2), said bar being curved about the vertical axis of pivot 4 as a center. Bar 20 is adjacent to the bearing sleeve 7 and forms a track for a runner 21 (Fig. 5) that may be rigidly secured to hitch 1 adjacent to the bearing sleeve 7.

The bar 20 may have forwardly extending legs 23 (Fig. 2) that are pivotally secured at 24 (Fig. 1) to a rigid portion of the tractor such as handles 5, and bracket members 25 (Fig. 1) may extend upwardly from the opposite ends of said bar 20.

Bracket members 25 may each be slotted at 26 to receive a bolt 27 carried by each handle. Thus the plow attachment is adjustable to different tractor arrangements, and the bar 20 virtually constitutes a track for runner 21.

Runner 21 extends around the bar or track 20 so that a downward pressure on the outer (rear) ends of handles 5 will be transmitted through the bracket members 25 to bar 20 without placing a strain on handle 15, it being understood that the bolts 27 are tightened so as to secure the bracket members 25 to arms 5. Thrust bearing 28 at the lower end of bearing sleeve 7, and a thrust bearing (not shown) within the upper end of bearing sleeve 7 will take any thrust load between spindle 8 and the bearing sleeve 7.

In the full line position of the disc 12 as seen in Figs. 1, 2 and 4, the rear end of the handle 15 of spindle 8 is swung to the right hand of an operator who is behind the handles 5 of the tractor. Disc 12 is consequently swung to the left relative to such operator, and a collar 30 secured to handle 15 engages the bearing 16 to limit the degree to which the handle, and consequently disc 12, can be swung.

In the position of the disc as seen in Fig. 4, the right hand edge of the disc will cut a furrow slice from the earth and will carry it to the left, and upwardly, for throwing it to the left side of the furrow as the top of the disc revolves to the right. The caster action of the elbow 9 at the lower end of the spindle 8 and the angle of the disc relative to horizontal and vertical will automatically hold the disc in the full line position shown in Fig. 2.

Upon the operator reaching the end of the plot he is plowing, the tractor may be turned around by elevating handles 5 so as to lift the plow out of the ground, and then swinging the tractor around.

After the tractor is turned around the handle 15 is swung to the other side thereby swinging the disc so that the opposite edge thereof will cut the next furrow slice from the earth, and then the rotation of the disc will throw the slice so cut to the right, or to the same side of the furrow as the preceding slice was thrown. The disc in its new position will automatically stay in that position by the resistance of the disc to cutting, until the operator again swings the handle back to the full line position of the handle 15 as seen in the drawings.

From the foregoing description it is seen that the operator following the tractor has control of the disc at any time and by a movement of handle 15 through only about 80 degrees the spindle 8 that carries the disc 12 will be rotated through an angle of about 120 degrees with the furrow cutting edge of said disc in both positions being substantially along the longitudinal axis X—X (Fig. 2) of the tractor. This distinguishes from the arrangements in which a reversing of the discs necessitates swinging them to positions in which their cutting edges are spaced to one side or the other thereof from such central axis.

Where the soil is hard, it is desirable that a rigid horizontally extending extension 31 in alignment with the hitch 1 be secured to bearing sleeve 7 in a position projecting rearwardly therefrom. This extension may be in the form of a bar having a vertical sleeve 32 at its rear end in which is adjustably secured the upper end of a vertical shaft 33. The lower end of shaft 33 below sleeve 32 may be offset forwardly by a bend 34 in said shaft between said lower end and said sleeve.

Pivotally supported on said lower end of shaft 33 below bend 34 is the forward end of a coulter supporting yoke 35, and which yoke carries a rolling coulter 36 between the rear ends of its arms.

The lower end of shaft 33 may carry a stop member 37 (Fig. 3) that is disposed in a cut away portion 38 of the forward end of the coulter supporting yoke so that the yoke will be limited in its swinging movement about the lower end of shaft 33, and so that the rolling coulter will automatically trail the hitch and plow disc 12 to hold the tractor steady in a straight path coincidental with axis X—X during cutting of hard earth by the plow.

The disc 12 and spindle 8 can readily be removed from the bearing 7 by removing a pin 39 (Fig. 1) that extends through the upper end of the spindle and through a socket member 40 that is rigid with handle 15. In this manner different discs can readily be substituted for the one shown, and which discs may have different angular positions relative to horizontal and vertical.

It is not intended that the detailed description should be considered restrictive of the invention. For example, the attachment can be secured to virtually any tractor by using suitable frame members. The structure illustrated is quite simple and effective for a small, walking, self propelled tractor of the type in which the plow can be easily and quickly lifted out of the ground in making a turn.

The principle of having the disc bearing, such as 10, ahead of the disc is applicable to discs that are in one or more groups and in such an arrangement the discs would automatically stay in one plowing position or the other without positively locking them.

I claim:

1. A reversible plow attachment for a tractor comprising a bearing sleeve, a vertically disposed spindle rotatably carried by said bearing sleeve for rotation about a vertically extending axis, a disc plow rotatable on and secured to the lower end of said spindle for movement with the latter to positions facing in directions diverging from opposite sides of a horizontal center line extending through said axis, a hitch rigidly secured at one end thereof to said bearing sleeve, pivot means at the other end of said hitch for pivotally securing said other end to such tractor for swinging said hitch, bearing sleeve, spindle, and disc plow laterally to and between two trailing positions of said disc plow at opposite sides of a line defining the path of travel of the tractor and substantially coincident with said center line when said one end of said hitch is connected to such tractor, with said other end and said bearing sleeve and plow in trailing relation to said tractor, and means connected with said spindle for so swinging said hitch and said bearing sleeve and for causing said rotatable movement of said spindle, said means being a handle projecting generally horizontally from the upper end portion of said spindle, a member for supporting said handle at a point intermediate its ends for revolvable movement of said handle about a generally vertically extending axis and for sliding of said handle longitudinally thereof, and means for securing said member to such tractor.

2. A reversible plow attachment for a tractor comprising: a bearing sleeve, a vertically disposed spindle rotatably carried by said bearing sleeve for rotation about a vertically extending axis, a disc plow rotatable on and secured to the lower end of said spindle for movement with the latter to positions facing in directions diverging from opposite sides of a horizontal center line extending through said axis, a hitch rigidly secured at one end thereof to said bearing sleeve, pivot means at the other end of said hitch for pivotally securing said other end to such tractor for swinging said hitch, bearing sleeve, spindle, and disc plow laterally to and between two trailing positions of said disc plow at opposite sides of a line defining the path of travel of the tractor and substantially coincident with said center line when said one end of said hitch is connected to such tractor, with said other end and said bearing sleeve and plow in trailing relation to said tractor, and means connected with said spindle for so swinging said hitch and said bearing sleeve and for causing said rotatable movement of said spindle, a substantially horizontally disposed bar spaced from and arcuately extending about said pivot means as a center, means rigid with said hitch and spindle sleeve held by said bar during said swinging of said hitch and spindle sleeve and means for securing said bar to such tractor.

3. A reversible plow attachment for a tractor comprising: a bearing sleeve, a vertically disposed spindle rotatably carried by said bearing sleeve for rotation about a vertically extending axis, a disc plow rotatable on and secured to the lower end of said spindle for movement with the latter to positions facing in directions diverging from opposite sides of a horizontal center line extending through said axis, a hitch rigidly secured at one end thereof to said bearing sleeve, pivot means at the other end of said hitch for pivotally securing said other end to such tractor for swinging said hitch, bearing sleeve, spindle, and disc plow laterally to and between two trailing positions of said disc plow at opposite sides of a line defining the path of travel of the tractor and substantially coincident with said center line when said one end of said hitch is connected to such tractor, with said other end and said bearing sleeve and plow in trailing relation to said tractor, and means connected with said spindle for so swinging said hitch and said bearing sleeve and for causing said rotatable movement of said spindle, said means being a handle projecting generally horizontally from the upper end portion of said spindle, a member for supporting said handle at a point intermediate its ends for revolvable movement of said handle about a generally vertically extending axis and for sliding of said handle longitudinally thereof, and means for securing said member to such tractor, said handle having a stop element thereon for limiting the sliding movement of said handle and the consequent swinging movement of said spindle sleeve, spindle and disc to said two trailing positions of said disc plow.

4. A reversible plow attachment for a tractor comprising: a horizontally extending hitch having a forward end and a rear end respectively adapted to be connected to a tractor and to carry a disc plow with the forward end leading the rear end when the hitch is connected to a tractor, a vertical pivot for connecting said forward end to a tractor, a vertically extending spindle carried by said rear end for rotation of said spindle about its vertical axis, a disc plow, a bearing on the lower end of said spindle at the concave side of said disc supporting said disc for rotation of the latter about its axis, means connected with said spindle for swinging said hitch about said pivot and for rotating said spindle and said disc about the axis of said spindle, a rolling coulter, and means carried by said hitch supporting said coulter in a position spaced from said rear end of said hitch and rearwardly of said spindle relative to said forward end of said hitch, said means for swinging said hitch including a horizontally extending arm connected at one end with said spindle, a frame member, and a bearing on said frame member supporting said arm at a point rearwardly of said hitch for swinging said arm about a vertical axis extending through said bearing and for slidable movement of said arm in said bearing longitudinally of said arm.

References Cited in the file of this patent
UNITED STATES PATENTS

| | | |
|---|---|---|
| 751,642 | Henry | Feb. 2, 1904 |
| 1,149,720 | Brown | Aug. 10, 1915 |
| 1,283,517 | Hogsett | Nov. 5, 1918 |